United States Patent [19]

Savage

[11] Patent Number: 4,497,046

[45] Date of Patent: Jan. 29, 1985

[54] LONG LINE HYDROPHONE

[75] Inventor: Howard T. Savage, Greenbelt, Md.

[73] Assignee: The United States of America as represented by the Secretary of the Navy, Washington, D.C.

[21] Appl. No.: 278,300

[22] Filed: Jun. 24, 1981

[51] Int. Cl.³ .............................................. G01V 1/38
[52] U.S. Cl. ................................... 367/169; 367/156; 310/26
[58] Field of Search ............... 367/156, 166, 168, 169, 367/171; 310/26; 73/649

[56] References Cited

U.S. PATENT DOCUMENTS

| 3,160,769 | 12/1964 | Abbott | 367/156 |
| 3,881,165 | 4/1975 | Parker et al. | 367/179 |
| 4,308,603 | 12/1981 | Overby | 310/26 |
| 4,361,879 | 11/1982 | Dubbelday et al. | 310/26 |

FOREIGN PATENT DOCUMENTS 54-53993  4/1979  Japan ................................. 367/168

OTHER PUBLICATIONS

Mitchell et al., "Deltae Effect . . . Glassy Ribbons", 11/78, IEEE Trans. Magn., vol. Mag. 14, #6, pp. 1169–1171.

Modzelewski et al., "Magnetomechanical Coupling . . . ", 5/15/81, pp. 2837–2839, vol. Mag. 17, France Conference.

Primary Examiner—Nelson Moskowitz
Attorney, Agent, or Firm—R. S. Sciascia; A. L. Branning; J. C. LaPrade

[57] ABSTRACT

A long line hydrophone wound with a pair of bifilar ribbons that are connected to a constant current high frequency source.

6 Claims, 4 Drawing Figures

FIG. 1
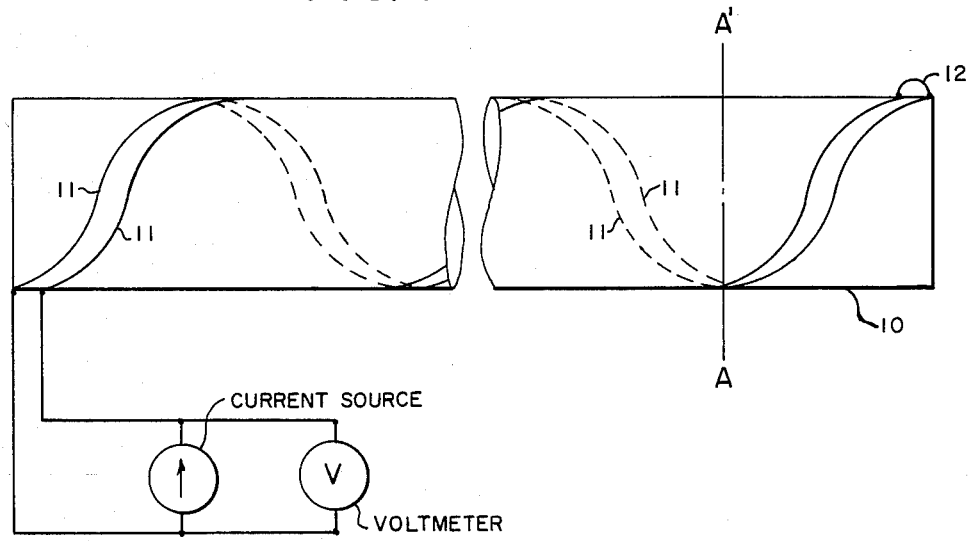
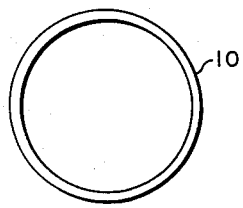
FIG. 2
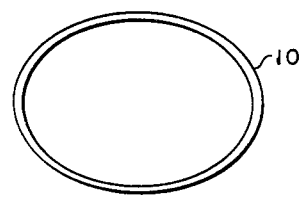
FIG. 3
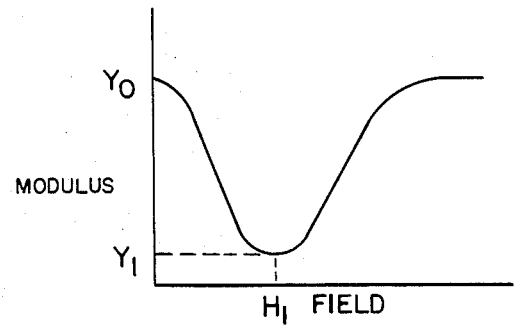
FIG. 4

LONG LINE HYDROPHONE

BACKGROUND OF THE INVENTION

Among the several types of sonar systems used to detect underwater objects such as submarines there are several types in which passive hydrophones are deployed or are used in towed arrays in large numbers in a given area and in some means is required to insonify the adjacent volume of water so that it echoes or reflection from such underwater objects are received at the sonobuoys.

Most towed array hydrophones sometimes called long line hydrophones have suffered from interference from flow noise and other interference from water flow and other similar interferences that has prevented towed arrays of long line hydrophones from being very effective in detection of underwater sounds.

It is also well known in the prior art that towed arrays of lone line hydrophones have poor low frequency response. That is to say there are numerous in long line hydrophones used in the prior art there are numerous standing wave problems. Standing waves are reflected back and forth in the long tubular element, in the prior art and therefore tend to set up nodes that interfere with the standing waves and sound waves from the objects submarines or other deep sea objects that generate sound waves. Therefore prior art has been subject to numerous low frequency problems primary from interference from standing waves and other sound waves generated or reflected within the long tubular element of the towed array.

In addition, presently the prior art arrays that are towed behind ships for the purpose of detecting sounds from the depths of the ocean are very sensitive to deep water depths and have a tendency to collapse or otherwise be physically distorted by use in water exceeding 40 feet in depth. Therefore it should be apparent to one skilled in the art that prior art devices have proved to be overly sensitive to the physical parameters of deep water for use in deep water.

In addition to the poor low frequency response of the prior art hydrophones most of such hydrophones are very fragile at depths in excess of 100 feet.

Most of the towed arrays are extremely fragile being made of lightweight metal, plastics and other similar materials. Part of the fragility problem relates to the fact that most long line hydrophones that make up towed arrays are hollow. The reason that the presently used prior art towed arrays are hollow are that when the towed arrays are filled with any particular liquid material there sensitivity is greatly reduced and noise interference is much greater. Therefore from the review of the prior art deficiencies it is clear that there is a needed for a towed array that can accomplish the desired insonification for a limited period of time enough to be launched into the ocean from an aircraft which ones mission is completed, can be towed behind a ship as a long line hydrophone to detect and measure ocean noises.

SUMMARY OF THE INVENTION

The invention comprises a hydrophone in the shape of a long flexible cylinder that can be towed behind a ship the inventive hydrophone is designed to detect low frequency sound and effect spatial averaging to reduce noise. A long flexible cylinder is wound with a pair of magnetorestrictive ribbons twisted about a compliant tube of circular or slightly elliptical cross section. The ribbon is usually limited to amorphous iron, boron, silicon, cobalt composition that have relatively large magnetorestriction and permeability.

The advantages and objects of the present invention are accomplished by utilizing an improved hydrophone assembly that comprises twisting a pair of bifilar iron alloy amorphous ribbons that have magneto restriction and permeability wherein a constant current source is applied across the pair of bifilar ribbons so that an AC voltmeter can detect any signal caused by a sound wave impinging on the tube.

OBJECTS OF THE INVENTION

It is one principal object of the invention to provide a long line hydrophone that has good low frequency response.

It is another object of the invention to provide a long line hydrophone that is relatively insensitive to the depth limitations of the prior art hydrophones.

It is one additional object of the invention to provide a strong long line hydrophone that is not fragile or breakable particularly when used at deep ocean depths.

It is still further object of this invention to provide a long line hydrophone that is capable of detecting low frequency sound and effect spatial arraying to reduce noise flow.

It is still one additional object of this invention to provide a long line hydrophone that is inexpensive to build and has good low frequency response.

BRIEF DESCRIPTION OF THE DRAWINGS

FIG. 1 is a side elevation of the hydrophone of the invention with part shown in cut away perspective view.

FIG. 2 is a cross section taken along line A—A' of FIG. 1.

FIG. 3 is a cross sectional view of the hydrophone when understress.

FIG. 4 is a graph illustrating the relationship of the modulus of the ribbon to the magnetic field.

DESCRIPTION OF THE PREFERRED EMBODIMENT

In FIG. 1 the tubular element 10 is wound with one or more pairs of armorphous iron alloy ribbons 11. The ribbons are usually from 0.0005 to about 1.002 inches thick. The preferred range of thickness is from 0.0008 in to 0.0012 inch thick.

The ribbons 11 are joined at one end by solder joint 12 and are connected across a constant current high frequency AC source of about 200 kHz. Any change in voltage is detected by a ac voltmeter. A dc current source (5–50 volts) with an AC voltmeter can also be used. Several layers of ribbons may be used if desired.

A dc bias field (5 oersted to 15 oersted) applied by either wrapping the entire element with a light helical copper winding or winding the bifilar magnetostrictive ribbon itself with a similar copper winding may be necessary.

In the preferred embodiment the ribbons are wound on the compliant tube with enough tension that the mount is pulled to roughly 45° to the ribbon axis.

The tube to be pulled behind a ship is usually from 1 to 10 ft in length.

When sound waves impinge upon the ribbons then the voltage will vary and cause the voltmeter to register a marked change in voltage.

When longer tubes are used the "spatial averaging" will eliminate or reduce noise flow.

The tube 10 is usually made of rubber or plastic, polyethylene.

The tube 10 may be filled with a liquid such as ethylalcohol or other equivalent liquids.

In FIG. 4 the relationship of modulus to magnetic field is disclosed. Any iron alloy with a large coupling factor will work. A high change in modulus with field ratio is highly desirable.

Obviously many modifications and variations of the present invention are possible in the light of the above teachings. It is therefore understood that within the scope of the appended claims the invention may be practiced otherwise than as specifically described.

What is claimed as new and desired to be secured by Letters Patent of the United States is:

1. A long line hydrophone comprising a long hollow compliant tube, the tube being tightly wound with multiple bifilar ribbons, with combined means to supply constant current to each bifilar ribbon at high frequency, each bifilar ribbon consisting of a magnetorestrictive material and where the compliant tube is filled with a suitable liquid and where the liquid moves to change the shape of the tube and to change the length and magnetoresistive properties of the bifilar ribbons in response to stress on the tube that produces a change in voltage and where the bifilar ribbons are connected to a low voltage DC bias, a constant current, high frequency source and means to measure the change in voltage.

2. The hydrophone of claim 1 wherein the tube is filled with a suitable liquid.

3. The hydrophone of claim 2 wherein the ribbons consist of an amorphous iron alloy, with a modulus that changes substantially with field.

4. The hydrophone of claim 3 wherein the ribbons are from 0.0008 inches thick to 0.002 inches thick.

5. The hydrophone of claim 1 wherein the original crossection is circular and remains circular as a function of stress.

6. The hydrophone of claim 1 wherein the original crossection is elliptcal and becomes more ellipticall as a function of stress.

* * * * *